UNITED STATES PATENT OFFICE.

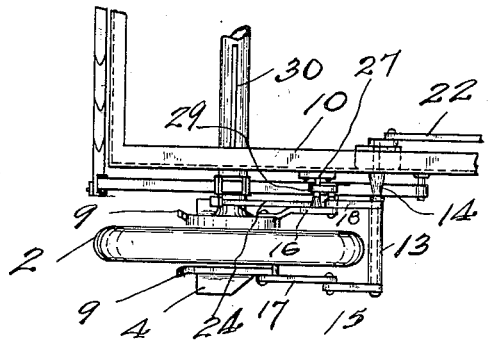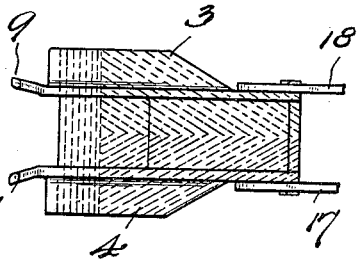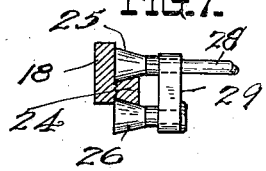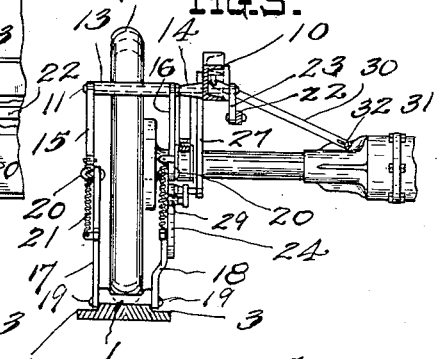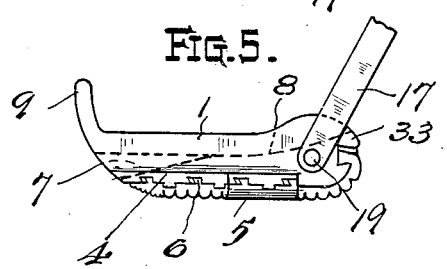

STEPHEN R. O'BRIEN, OF PITTSBURGH, PENNSYLVANIA.

VEHICLE-BRAKE.

1,077,546.   Specification of Letters Patent.   Patented Nov. 4, 1913.

Application filed March 24, 1913. Serial No. 756,461.

*To all whom it may concern:*

Be it known that I, STEPHEN R. O'BRIEN, a citizen of the United States, residing at Pittsburgh, in the county of Allegheny and State of Pennsylvania, have invented certain new and useful Improvements in Vehicle-Brakes, of which the following is a specification.

My invention relates to improvements in vehicle brakes and is applicable especially for use in connection with road vehicles such as automobiles, etc.

The primary object of the invention is the provision of an emergency brake of the chock type adapted for use under a traction wheel or driving wheel of an automobile not only to retard the forward movement of the vehicle, but also for the purpose of preventing the rear wheels skidding should the tendency to do so arise while the automobile is traveling.

The invention consists in certain novel combinations and arrangements of parts and levers, actuated from the seat of the chauffeur, and including a shoe or chock whereby the latter is shunted under the rear wheel when desired, to absorb the friction as the car or automobile is retarded or prevented from skidding.

In the accompanying drawings I have illustrated one complete example of the physical embodiment of my invention constructed according to the best mode I have so far devised for the practical application of the principles of my invention.

Figure 1 is a plan view of a fragmentary portion of the rear, right-side drive wheel and supporting parts, with my new emergency brake and actuating apparatus applied thereto. Fig. 2 is an outside elevation, parts being broken away for purposes of illustration, of Fig. 1. Fig. 3 is a front edge view of Fig. 2. Fig. 4 is a top plan view of the shoe or chock, detached, showing in dotted lines the directions in which the corrugations are arranged on the rubber shoe of the chock. Fig. 5 is a side elevation of the chock showing a portion of a suspending lever. Fig. 6 is a rear view of the chock, as seen from the left in Fig. 5. Fig. 7 is an enlarged detail sectional view of the guiding means utilized in connection with the suspending lever or arm of the chock.

In the preferred embodiment of my invention as illustrated, the chock 1 is adapted to be shunted under the wheel 2 of the automobile, and this chock is preferably an integral metallic piece formed with side extensions 3, 4, in order to provide a broad surface for frictional contact with the surface over which the chock is moving.

The chock is furnished with a corrugated rubber shoe or facing 5 which is provided with dove-tail ribs 6 adapted to fit into complementary grooves in the under face of the chock in well known manner, for securing these or similar parts together. The shoe or facing 5 is provided with corrugations running in the directions indicated by dotted lines in Fig. 4, in order to be effective should the car skid in either lateral direction when moving forward.

An incline 7 is formed on the upper face of the chock which leads to the circular seat 8 for the tread of the wheel to rest in when the chock is in braking position, and the wheel is thus permitted to ride upon the chock without jar or shock, a horn 9, 9 at each side of the chock acting as a guide for the wheel.

The chock is supported or suspended from the frame bar 10 of the automobile by means of a stud shaft 11 which is adapted to rock in the frame bar and provided with tubular separators or sleeves 13 and 14, the latter acting also as a journal bearing. At each side of the wheel a hanger or suspending bar 15, and 16, is fixed to rock with the rock shaft 11, and these hangers 15, 16 are pivoted to another pair of arms 17, 18 respectively, which are pivoted at 19 to the chock 1. These hangers 15—17 and 16—18 are adapted to "double up" or fold on their pivots 20, and a spring 21 on each hanger acts as a cushion, as will be described.

The hangers are actuated from the front of the automobile by means of the draw bar 22 which is connected to the crank arm 23 fixed on the rock shaft 11.

The normal, inoperative, position of the chock is illustrated in Fig. 2 by dotted lines, with the hangers doubled on their pivots 20, and to shunt the chock to operative position, the draw bar is pulled to rock the shaft 11. The sections 15, 16 being rigid with the stud shaft, they are swung downwardly, and the sections 17 18 swing on their pivots 20. These sections however are guided, so that the shoe is moved positively to its operative position, by the movement of a cam rib 24 integral with one of the hanger sections, as 18, which rides between a pair of friction rollers 25, 26 supported from a stationary bracket 27 which is fixed to the frame of the car. In order to accommodate the curved lines of the cam rib, the roller 26 is flexibly supported from the stud 28 of the roller 25, by a pivoted link 29.

A brace bar 30 which extends from the frame to the differential housing 31 to which it is pivoted with a slotted connection at 32, is provided to take up any strains, and to permit vertical movement of the car on its springs, but any side movement of the frame or excessive lateral tendency will be taken care of by the brace bar.

A lug 33 on the chock forms an obstruction or stop and holds the chock in proper position with relation to the hanger bar 17 when the device is being operated.

To actuate the brake and throw it into operative position, assuming the device to be in the position indicated by dotted lines Fig. 2, a pull is applied to draw bar 22 which rocks the stud shaft 11 to throw down the hangers 15—17 and 16—18, which unbend on their pivots 20, and the guide or cam rib 24 passing between the stationary rollers 25, 26, guides the lower sections 17 and 18 to shunt the chock under the front of the wheel 2. The hangers are thus straightened out to position in full lines Fig. 2, and the springs 21 absorb the shock when the hanger sections come to alinement, thus acting as a cushion to prevent any jerky motion of the parts. The hangers are thus suspended in alinement from the stud shaft 11 with the chock in position to be ridden upon by the wheel. The wheel rides up the incline 7 of the chock, without perceptible impediment and then into the seat 8. The hangers are now prevented from swinging any farther to the rear on the stud shaft, by the engagement with the cam guide rib 24 with the rollers 25, 26, and the chock is thus held under the wheel to drag over the ground in frictional contact therewith. This frictional contact proves an efficient means for retarding and stopping the car in its forward movement, when used for the purposes of a brake, and is also effective to prevent skidding of the car, as will be clearly understood.

What I claim as new and desire to secure by Letters Patent is:—

An emergency brake including a chock, a pair of hanger bar sections pivoted to the chock, a rock shaft and a second pair of hanger bars pivoted to the first pair so that the sections may double up, springs for absorbing shock when said parts are straightened, means for rocking the shaft, a cam guide rib integral with one section hanger, and anti-friction means engaging said cam guide for positively guiding the chock to operative position.

In testimony whereof I affix my signature in presence of two witnesses.

STEPHEN R. O'BRIEN.

Witnesses:
W. A. HIRTLE,
JOHN F. SWEENEY.